United States Patent Office 2,951,754
Patented Sept. 6, 1960

2,951,754

α,β,β'-TRICHLOROISOBUTYRIC ACID AND A PROCESS OF ERADICATING PLANTS WITH FUNCTIONAL DERIVATIVES THEREOF

John Russell Bishop, Hatfield, Pa., assignor to Amchem Products, Inc., Ambler, Pa., a corporation of Delaware No Drawing. Filed Sept. 8, 1958, Ser. No. 759,401

1 Claim. (Cl. 71—2.5)

This application is a continuation-in-part of my co-pending application Serial No. 628,963, filed December 18, 1956, now abandoned.

The invention relates to α,β,β'-trichloroisobutyric acid and its functional derivatives such as the alkali metal salts, the ammonium and amine salts and the esters thereof.

The acid may readily be prepared by direct chlorination of isobutyric acid in the presence of chlorination catalysts, such as phosphorous trichloride, bromine, ferric chloride and the like, the chlorination being carried out from room temperature to 180° C.

The following is a non-limitative example of the preparation of α,β,β'-trichloroisobutyric acid:

EXAMPLE 55 cc. of phosphorous trichloride were dissolved in 958 gms. of isobutyric acid in a glass reaction vessel equipped with a gas inlet and a gas outlet tube. Chlorine gas was passed into the acid for a period of 25 hours at the rate of about 125 gms. per hour. The reaction being exothermic, a temperature of approximately 75° C. was attained shortly after the initial addition of chlorine. External heat was then applied and the temperature was held at 145–160° C. during the 25 hour period. At the end of this period the addition of chlorine was interrupted, the reaction mixture was allowed to cool and the liquid was decanted from the tar that had been formed. The liquid was then returned to a reaction vessel and an additional 30 cc. of phosphorous trichloride were added. Chlorine was again passed into the reaction mixture at the rate of about 250 gms. per hour for an additional period of 4 hours at 150–160° C. The liquid portion was again separated from the tar and was found to weigh 1569 gms. This material was washed twice with 500 cc. portions of brine, dried and distilled under reduced pressure. The following fractions were obtained:

*Table I*

| Fraction | t. ° C. | P, mm. | Weight, gms. |
|---|---|---|---|
| 1 | to 125 | 10 | 19 |
| 2 | 115–130 | 5–6 | 195 |
| 3 | 130–135 | 8 | 582 |
| 4 | 135–145 | 8 | 132 |

Fraction 3 was redistilled as indicated in the following table:

*Table II*

| Fraction | t. ° C. | P, mm. | Weight, gms. | Neut. Equiv. |
|---|---|---|---|---|
| A | 98–118 | 4–5 | 148 | 172.8 |
| B | 118–122 | 4–5 | 324 | 178.8 |
| C | 122–126 | 4–5 | 75 | 192.9 |

Fraction C, as shown, had a neutralization equivalent of 192.9 as compared to a theoretical equivalent of 191.2 for α,β,β'-trichloroisobutyric acid. It contained 55.8% of chlorine as compared to a theoretical value of 55.6 for α,β,β'-trichloroisobutyric acid.

The structure of the compound was determined from its infra-red absorption curve in conjunction with the above analytical results for neutralization equivalent and chlorine content. These latter indicate a compound corresponding to the empirical formula $C_3H_4Cl_3COOH$, that of a tri-chlorinated acid. Its infra-red absorption spectrum exhibits absorption at the frequnecy characteristic of α-halogenated acids. No absorption is shown at the frequency which is characteristic of the C—$CH_3$ linkage; however, absorption corresponding to the group —$CH_2$— is shown. For a trichlorinated isobutyric acid possessing an α-halogen atom, only two structures are possible:

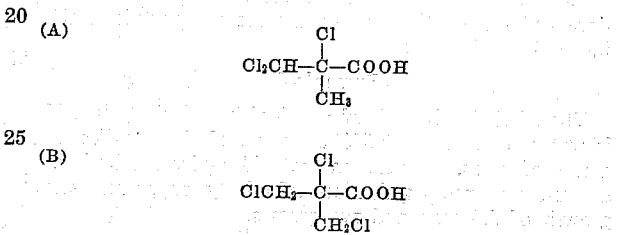

Since Formula (A) has a C—$CH_3$ linkage and does not have a —$CH_2$— group required by the infra-red data, this structure is impossible. Hence, the compound is α,β,β'-trichloroisobutyirc acid, Formula (B).

α,β,β'-trichloroisobutyric acid is a liquid which is relatively water-insoluble and relatively soluble in alcohols and other common organic solvents. It readily forms such functional derivatives as the alkali metal salts, the ammonium and amine salts and esters. The salts are prepared by simply adding the acid to equivalent amounts of an aqueous solution of the alkali metal hydroxide, ammonium hydroxide or amine. Specific examples of the readily formed salts are the sodium, potassium and ammonium salts. Specific examples of the readily formed amine salts are the monomethyl, diethyl, diamyl, triethyl, tripropyl, tributyl, dodecyl, isodecyl, di(2-ethyl hexyl), the mono, di, triethanol and the isopropanol amine salts.

The acid is readily esterified with various alcohols using conventional esterification methods. The esters appear to be somewhat unstable as they are readily saponified back to the acid. Specific examples of the readily formed esters are the methyl, ethyl, hexyl, dodecyl and oleyl esters, the monoethylene glycol ether esters such as methyl, propyl, hexyl, benzyl and phenyl Cellosolves, the diethylene glycol ether esters such as methyl, ethyl, butyl, benzyl and phenyl Carbitols, the polyethylene glycol esters such as the carbowaxes of m.w. 600 or over and the tetrahydrofurfuryl ester.

α,β,β'-trichloroisobutyric acid and its functional derivatives exhibited marked herbicidal activity which is different from and superior to that shown by other chloro substituted isobutyric acids. They are particularly effective in controlling crab and Johnson grass infestation in lawn grasses.

Thus, a post-emergence application of the acid and its sodium salt in the form of an aqueous dispersion and solution, respectively, at the rate of 5 lbs. per acre to typical lawn grass plots resulted in a substantially total destruction of common crab grass without causing any significant discoloration of the desired grass species. Similarly, applications of the acid and its sodium salt in amounts up to 10 lbs. per acre resulted in compelte removal of the crab grass with only negligible discoloration of the desired grasses, such as Kentucky bluegrass, Merion bluegrass, and Highland bentgrass. Even applications at rates of 20 lbs. per acre produced only minor discoloration of the aforementioned desirable grass species.

Pre-emergent applications of the acid and its sodium salt to lawn plots at the rate of 8 lbs. per acre resulted in substantially total destruction of crab grass infestation with virtually no injury to desired lawn grasses. It was also found that pre-emergent treatment of plots containing Johnson grass and cotton resulted in excellent control of the Johnson grass without causing any visible effects upon the cotton.

Although $\alpha,\beta,\beta'$-trichloroisobutyric acid is relatively water-insoluble, aqueous dispersions of the acid may effectively be employed for its application. Formulations of the acid and its functional derivatives may be made employing conventional wetting and dispersing agents, penetrants, sequestrants, oils and cosolvents. Some illustrative, but non-limitative examples of solutions and formulations employing the compounds of the instant invention are:

Example I

The triethylamine salt of $\alpha,\beta,\beta'$-trichloroisobutyric acid is water soluble. A 0.5% aqueous solution applied at a rate of 4 lbs. per acre on the acid equivalent basis in a pre-emergence application effectively suppresses the growth of Johnson and rye grasses.

Example II

| | Parts |
|---|---|
| Butyl Carbitol ester of $\alpha,\beta,\beta'$-trichloroisobutyric acid | 50 |
| Atlas G-1086 (polyoxyethylene sorbitol hexyl-oleate) | 50 |

This concentrate is diluted with water and sprayed in pre or post-emergence application at the conventional rates per acre on the acid equivalent basis.

Example III

| | Parts |
|---|---|
| Butyl cellosolve ester of $\alpha,\beta,\beta'$-trichloroisobutyric acid | 43 |
| Atlox G-1255 (polyoxyethylene sorbitol tall oil condensate) | 5 |
| Cosolvent | 5 |
| Heavy aromatic naptha | 47 |

This concentrate is diluted with water and sprayed in pre or post-emergence application at the conventional rates per acre on the acid equivalent basis.

Example IV

| | Parts |
|---|---|
| Diethanolamine salt of $\alpha,\beta,\beta'$-trichloroisobutyric acid | 75 |
| Xylene | 15 |
| Agrimul 70 A (polyoxyethylene ether of alkylated phenol) | 10 |

This concentrate is readily emulsified in water for conventional high and low volume spray applications at conventional rates, such as 4 lbs. per acre on the acid equivalent basis.

I claim:

A process of eradicating undesirable plants comprising applying to the plants a compound selected from the class consisting of $\alpha,\beta,\beta'$-trichloroisobutyric acid, its alkali metal salts, its ammonium and alkyl and alkanol amine salts, its alkyl esters, its monoethylene glycol ether esters, its diethylene glycol ether esters, its polyethylene glycol esters and its tetrahydrofurfuryl ester in a concentration and amount sufficient to eradicate the plants.

References Cited in the file of this patent

UNITED STATES PATENTS

| | | |
|---|---|---|
| 2,097,264 | Tattersall | Oct. 26, 1937 |
| 2,642,354 | Barrons | June 16, 1953 |
| 2,655,521 | Ladd et al. | Oct. 13, 1953 |
| 2,700,678 | Scoles | Jan. 25, 1955 |
| 2,719,783 | Kohn | Oct. 4, 1955 |
| 2,821,546 | Senkbeil | Jan. 28, 1958 |